United States Patent
Zeng et al.

(10) Patent No.: US 9,823,928 B2
(45) Date of Patent: Nov. 21, 2017

(54) FIFO LOAD INSTRUCTION

(75) Inventors: Mao Zeng, Austin, TX (US); Lucian Codrescu, Austin, TX (US); Erich James Plondke, Austin, TX (US); Ajay Anant Ingle, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 782 days.

(21) Appl. No.: 13/249,284

(22) Filed: Sep. 30, 2011

(65) Prior Publication Data
US 2013/0086360 A1    Apr. 4, 2013

(51) Int. Cl.
G06F 9/30    (2006.01)

(52) U.S. Cl.
CPC ........ G06F 9/3004 (2013.01); G06F 9/30032 (2013.01); G06F 9/30043 (2013.01)

(58) Field of Classification Search
CPC .................................................. G06F 9/30032
USPC .......................................................... 712/221
See application file for complete search history.

(56) References Cited

U.S. PATENT DOCUMENTS

| | | | |
|---|---|---|---|
| 3,360,779 A | 12/1967 | Ulrich | |
| 5,781,457 A * | 7/1998 | Cohen et al. | ................. 708/231 |
| 5,991,531 A * | 11/1999 | Song et al. | ...................... 703/26 |
| 6,334,176 B1 * | 12/2001 | Scales, III | .......... G06F 9/30025 |
| | | | 712/4 |
| 7,126,991 B1 | 10/2006 | Mimar | |
| 7,219,212 B1 * | 5/2007 | Sanghavi | ............ G06F 9/30021 |
| | | | 712/225 |
| 7,219,215 B2 | 5/2007 | Ford et al. | |
| 7,275,147 B2 | 9/2007 | Tavares | |
| 7,350,058 B2 * | 3/2008 | Carpenter et al. | ............ 712/224 |
| 8,838,086 B2 | 9/2014 | Giaretta et al. | |
| 2002/0166037 A1 | 11/2002 | Launiainen | |
| 2003/0120889 A1 * | 6/2003 | Roussel | .............. G06F 9/30036 |
| | | | 711/201 |
| 2003/0131030 A1 * | 7/2003 | Sebot et al. | ................... 708/209 |
| 2005/0283589 A1 * | 12/2005 | Matsuo | ......................... 712/217 |
| 2006/0101258 A1 * | 5/2006 | Jones et al. | ..................... 712/300 |
| 2007/0052557 A1 * | 3/2007 | Magdeburger | ........ G06F 7/5443 |
| | | | 341/50 |
| 2008/0034189 A1 * | 2/2008 | Codrescu et al. | ............ 712/223 |

FOREIGN PATENT DOCUMENTS

| | | |
|---|---|---|
| CN | 101482811 A | 7/2009 |
| JP | S625441 A | 1/1987 |

(Continued)

OTHER PUBLICATIONS

Wang, Yao. "Motion Estimation for Video Coding." 2003. <http://www.ntua.gr/best/ac13/motion_estimation.pdf>.*

(Continued)

*Primary Examiner* — Eric Coleman
(74) *Attorney, Agent, or Firm* — Qualcomm Incorporated (57) ABSTRACT

An instruction identifies a register and a memory location. Upon execution of the instruction by a processor, an item is loaded from the memory location and a shift and insert operation is performed to shift data in the register and to insert the item into the register.

23 Claims, 6 Drawing Sheets

(56) References Cited

U.S. PATENT DOCUMENTS

| | | | | |
|---|---|---|---|---|
| 2008/0114969 | A1* | 5/2008 | Gonion | G06F 9/30032 712/223 |
| 2008/0320277 | A1 | 12/2008 | Fish, III | |
| 2009/0144529 | A1* | 6/2009 | Eichenberger et al. | 712/241 |
| | | (Continued) | | |
| 2010/0174883 | A1* | 7/2010 | Lerner et al. | 712/11 |
| 2011/0072170 | A1* | 3/2011 | Flachs | G06F 9/30007 710/22 |
| 2011/0087859 | A1* | 4/2011 | Mimar | G06F 9/30043 712/4 |

FOREIGN PATENT DOCUMENTS

| | | |
|---|---|---|
| JP | H07295882 A | 11/1995 |
| JP | H0927030 A | 1/1997 |
| JP | 2008198223 A | 8/2008 |
| JP | 2008258762 A | 10/2008 |
| JP | 2009009587 A | 1/2009 |
| JP | 2009525545 A | 7/2009 |
| WO | 2013052897 | 4/2013 |

OTHER PUBLICATIONS

ARM, "RealView Compilation Tools Assembler Guide", Mar. 2007, Version 3.1, p. 5-36.*
David Belton, "Circuit Implementation Using Multiplexers", retrieved Jan. 24, 2001, <https://web.archive.org/web/20010124072300/http://www.ee.surrey.ac.uk/Projects/Labview/multiplexed>.*
Hennessy, J.L., etal , Computer Architecture A Quantitative Approach, 2003, Morgan Kaufmann Publishers, $3^{rd}$ Ed. pp. 259-261.*
International Search Report and Written Opinion—PCT/US2012/058181—ISA/EPO—May 12, 2013.
Goto K., et al., "H.264 Video Encoder Using a Low Power DSP", Apr. 14, 2006, vol. 106, No. 21, pp. 43-48.
Intel® 64 and IA-32 Architectures Developer's Manual: vol. 2B The English document is available from: http://www.intel.com/content/www/us/en/architecture-and-technology/64-ia-32-architectures-software-developer-vol-2b-manual.html, Sep. 2016, 706 pages.

* cited by examiner

FIFO LOAD INSTRUCTION

I. FIELD

The present disclosure is generally related to a first-in-first-out (FIFO) load instruction.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Multimedia devices such as wireless telephones and digital cameras can include multimedia digital signal processors. One process performed by multimedia digital signal processors is finite impulse response (FIR) filtering. In FIR filtering, a sliding window FIR may be recursively applied to an input data stream, where data in each window is subjected to multiply and accumulate operations. For example, an input data stream stored in memory may be loaded and a sliding window filter may be applied to a first portion of the data stream to obtain a first output. Next, the data stream may be shifted by a value (e.g., to "slide" the window over the remaining data stream) and the sliding window filter may be applied to a second portion of the data stream to obtain a second output. Another process performed by multimedia signal processors is motion estimation, which may subject data in each window to absolute difference and accumulate operations.

Current FIR and motion estimation techniques may use hardware that supports loading data streams at any byte alignment into memory (e.g., custom hardware to perform a load align operation from any byte address). However, such custom hardware may be expensive and may not be desirable in small devices (e.g., mobile phones) because of the additional space occupied by the custom hardware. Other techniques may employ using multiple instructions to load a target data stream from memory and to perform a shift operation. For example, a first instruction may load a target data stream (e.g., $D_7 D_6 \ldots D_0$) from memory into a first register (e.g., RF(0)), and a second instruction may perform a shift left operation on the target data stream and a shift right operation on data previously stored in a second register (e.g., RF(1)). The shifted target data may then be inserted and the shifted into a third register (e.g., RF(2)).

III. SUMMARY

A single instruction that performs data load, shift (i.e., alignment), and insert operations is disclosed. For example, the instruction may be used to perform data load, shift, and insert operations in conjunction with other executable instructions to perform FIR filtering and motion estimation at an electronic device (e.g., mobile devices and digital cameras). For example, during FIR filtering, multiply and accumulate operations may be performed. As another example, during motion estimation, sum of absolute differences operations may be performed. In one implementation, the instruction may identify a register and a memory location. The register may include previously stored data (e.g., representing a FIFO buffer), and the memory location may contain an item (e.g., a byte, a half-word, or a word) that is to be inserted into the register. When the instruction is executed by a processor, the item may be loaded from the memory location into the register, and a shift and insert operation may be performed to shift the previous data in the register and to insert the item into the register. The load operation, the shift operation, and the insert operation may be performed in the same execution cycle of the instruction. Further, the instruction may take advantage of instruction level parallelism of very long instruction word (VLIW) architectures. For example, a single VLIW packet may contain multiple such instructions that are executable in parallel.

In a particular embodiment, an apparatus includes a memory storing an instruction that identifies a register and a memory location. Upon execution of the instruction by a processor, an item is loaded from the memory location and a shift and insert operation is performed to shift data in the register and to insert the item into the register.

In another particular embodiment, a method includes receiving an instruction that identifies a register and a memory location. The method includes executing the instruction. Executing the instruction includes loading an item from the memory location, shifting data in the register, and inserting the item into the register.

In another particular embodiment, an apparatus includes means for storing an instruction that identifies a register and a memory location. The apparatus also includes means for executing the instruction. The means for executing the instruction includes means for loading an item from the memory location, means for shifting data in the register, and means for inserting the item into the register.

In another particular embodiment, a non-transitory computer-readable medium includes program code that, when executed by a processor, causes the processor to receive a single instruction that identifies a register and a memory location and to execute the single instruction. Executing the single instruction includes loading an item from the memory location, shifting data in the register, and inserting the item into the register.

One particular advantage provided by at least one of the disclosed embodiments is reduced code size and fewer execution cycles for applications (e.g., embedded multimedia processing applications) due to use of a single instruction to perform data load, shift (i.e., alignment), and insert functionality. Another particular advantage is smaller, cheaper, and less power-intensive electronic devices, due to the ability of the disclosed instruction to support misaligned data without use of extra customized hardware.

Other aspects, advantages, and features of the present disclosure will become apparent after review of the entire application, including the following sections: Brief Description of the Drawings, Detailed Description, and the Claims.

V. DETAILED DESCRIPTION

An instruction for performing data load, shift, and insert functionality may identify a register and a memory location. When the instruction is executed, an item (e.g., a byte, a half-word, or a word) may be loaded from the memory location and a shift and insert operation may be performed to shift data in the register and to insert the item into the register. The load, shift and insert operations may be performed during the same execution cycle. The shift and insert operation may remove a portion of the data from the register to create room for the item to be inserted into the register. The removed portion may represent a data element being "popped" from the front of a first-in-first-out (FIFO) buffer and the newly added item may represent a data element being "pushed" into the back of the FIFO buffer. The instruction may be executable in conjunction with other executable instructions (e.g., multiply and accumulate instructions) to perform a filtering operation on the data stored in the register. The filtering operation may be a finite impulse response (FIR) operation (e.g., used by a modem, a voice coder/decoder (CODEC), an audio codec, an image processor, or a video codec). The instruction may also be executable in conjunction with other executable instructions (e.g., sum of absolute differences instructions) to perform a motion estimation operation on the data stored in the register.

Figure 1:
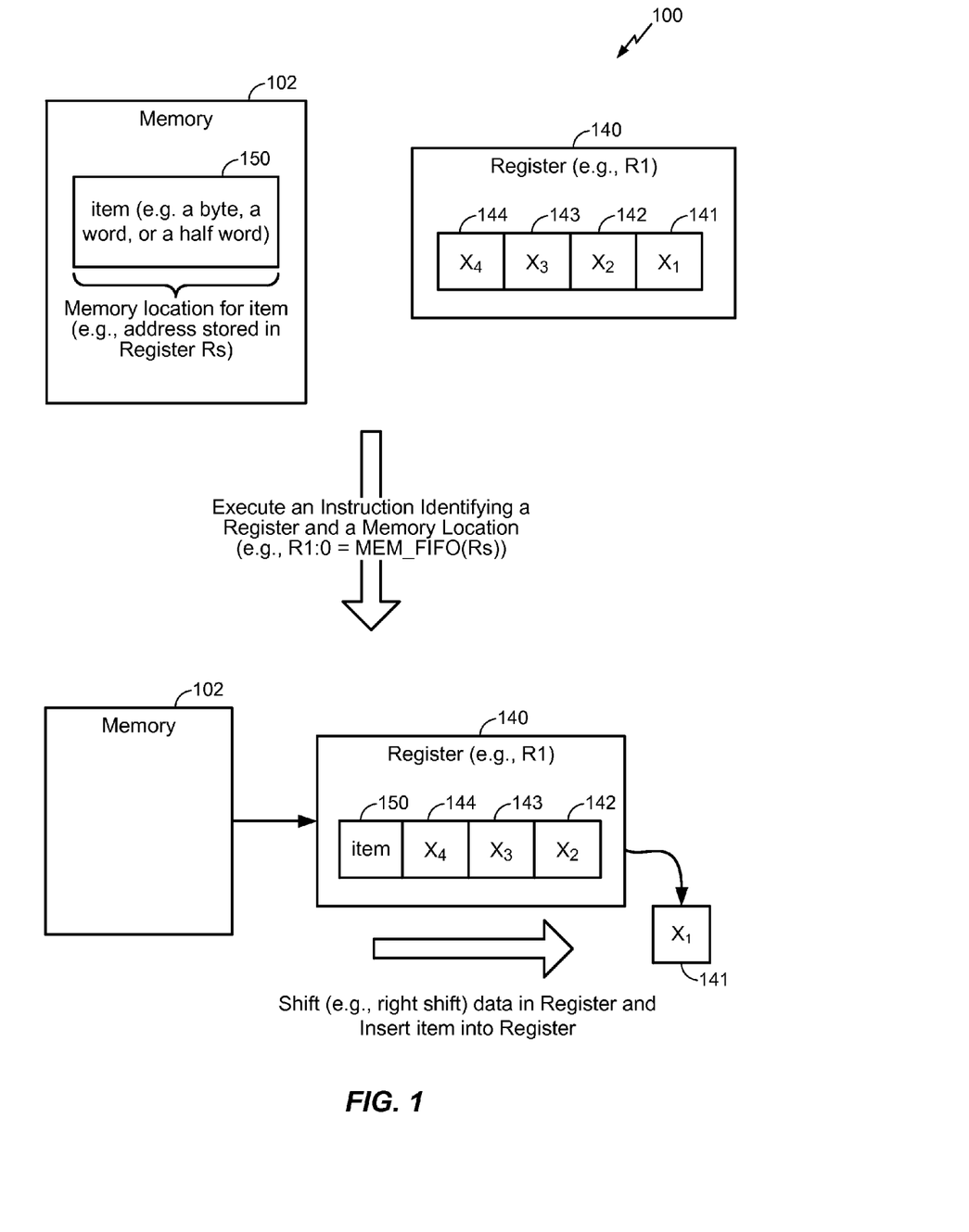
FIG. 1 is a diagram that illustrates executing an instruction that identifies a register and a memory location.
Figure 2:
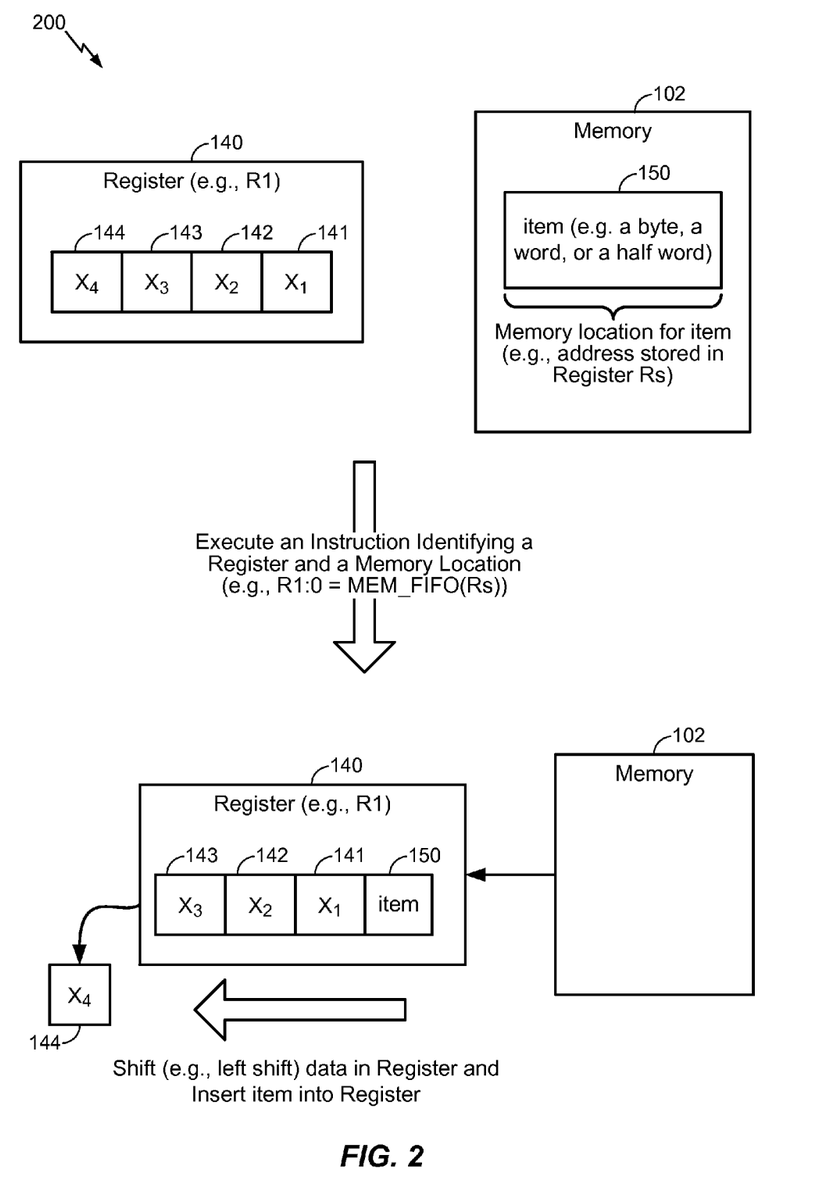
FIG. 2 is another diagram that illustrates executing an instruction that identifies a register and a memory location.

FIGS. 1-2 depict two examples of execution of a FIFO load instruction identifying a register and a memory location. Referring to FIG. 1, a first illustrative example of execution of the FIFO load instruction is disclosed and generally designated 100.

The FIFO load instruction may identify a register and a memory location, where the memory location includes an item to be loaded into the register. The register may be a register pair or a single register. For example, as illustrated in FIG. 1, the FIFO load instruction may be "R1:0=MEM_FIFO(Rs)," where 'MEM_FIFO' is an opcode of the FIFO load instruction, 'Rs' is a register in the memory 102 that stores the address for the item 150, and 'R1' is the register 140 that includes data 144, 143, 142, and 141 (e.g., $X_4 X_3 X_2 X_1$) in which item 150 will be loaded. The register 140 may operate as a FIFO buffer with respect to the data 141-144 (e.g., the data $X_1$ 141 may be located at a front of the FIFO buffer, and the data $X_4$ may be located at a back of the FIFO buffer).

In a particular embodiment, the item 150 may be a byte, a half-word, or a word. The FIFO load instruction may also specify if the item is a byte, a half-word, or a word. It should be noted that the item may be any other length. For example, a "MEMB_FIFO" opcode may indicate that the item 150 is a byte (e.g., the instruction may be "R0=MEMB_FIFO(Rs)"), a "MEMH_FIFO" opcode may indicate that the item 150 is a half-word (e.g., the instruction may be R1=MEMH_FIFO(Rs)"), and a "MEMW_FIFO" opcode may indicate that the item 150 is a word. The instruction may be executable by an execution unit or a load/store unit of a processor in conjunction with other executable instructions to perform a filtering operation on the data 144-141 in the register 140. The filtering operation may be used to perform finite impulse response filtering or motion estimation (e.g., of video data in a mobile device or a digital camera). For example, the instruction may be used in conjunction with other executable instructions to perform motion estimation for multiple regions of a video frame or multiple video frames in parallel, as further described with reference to FIG. 3.

During operation, the FIFO load instruction that identifies the register 140 and the memory location for item 150 may be retrieved from the memory 102 (e.g., a random access memory (RAM)), and may be executed by an execution unit or a load/store unit (e.g., a load hardware unit or a load aligner unit) of a processor. When executed, the FIFO load instruction may cause the item 150 to be loaded from the memory location, as illustrated. In addition, a shift and insert operation may be performed to shift the data 141-144 in the register 140 and to insert the item 150 into the register 140. In a particular embodiment, loading the item 150 from the memory location and the shift and insert operation may be performed during the same execution cycle of the processor.

As illustrated in FIG. 1, after loading item 150 from the memory location, the data 141-144 in the register 140 may be shifted right and the item 150 may be inserted at the back of the FIFO buffer stored in the register 140. For example, the data 144-141 (i.e., $X_4 X_3 X_2 X_1$) in the register 140 may be shifted right, causing the data 141 (i.e., $X_1$) to be removed from the register 140, and the item 150 may be inserted into the register 140, as shown in FIG. 1. Accordingly, the MEM_FIFO instruction of FIG. 1 may enable data load, shift, and insert operations by use of a single instruction.

Referring to FIG. 2, a second illustrative example of execution of the FIFO load instruction "R1:0=MEM_FIFO (Rs)" is disclosed and generally designated 200. Whereas FIG. 1 depicts a shift right operation to make room for insertion of the item 150 into the left side (e.g., a most significant portion) of the register 140, FIG. 2 depicts a shift left operation to make room for insertion of the item 150 into the right side (e.g., a least significant portion) of the register 140. Upon execution of the FIFO load instruction, the item 150 may be loaded from the memory location, a shift left operation may be performed to shift the data 141-144 in the register 140, and an insert operation may be performed to insert the item 150 into the register 140. Thus, the disclosed FIFO load instruction may be used with FIFO buffers oriented in both left-to-right as well as right-to-left directions in a register.

Figure 3:
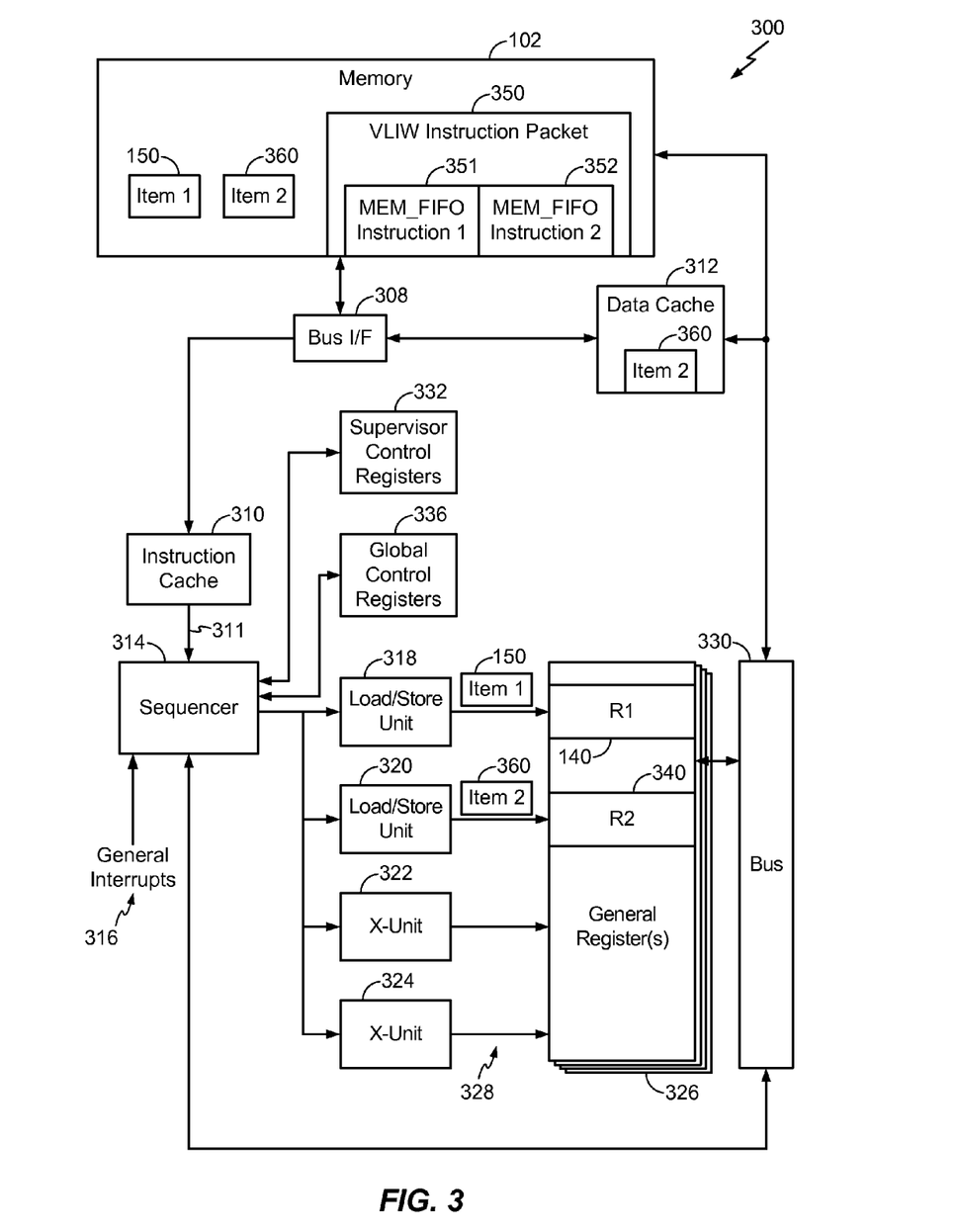
FIG. 3 is a diagram of a particular illustrative embodiment of a system that includes a memory storing an instruction that identifies a register and a memory location.

Referring to FIG. 3, a particular illustrative embodiment of a system operable to store and process an instruction packet (e.g., a VLIW instruction packet 350) including multiple FIFO load instructions 351, 352 is disclosed and generally designated 300.

The system 300 may include a memory 102 storing the instruction packet 350. The memory 102 may be coupled to an instruction cache 310 via a bus interface 308. The first FIFO load instruction 351 may identify a first register (e.g., register 140 designated R1) and a first memory location for a first item 150 (e.g., designated item 1). The second FIFO load instruction 352 may identify a second register (e.g., register 340 designated R2) and a second memory location for a second item 360 (e.g., designated item 2). The items 150, 360 may be stored at the memory 102 and/or at a data cache 312. For example, FIG. 3 illustrates that the first item 150 is stored in the memory 102 and the second item 360 is stored in both the data cache 312 and the memory 102. The first register 140 and the second register 340 may be part of a general register file 326. In a particular embodiment, all or a portion of the system 300 may be integrated into a processor. Alternately, the memory 102 and the bus 330 may be external to the processor.

The memory 102 may transmit the instruction packet 350 to the instruction cache 310 via the bus interface 308. The data cache 312 may also be coupled to the memory 102 via the bus interface 308. In a particular embodiment, the memory 102 may be accessible by a processor (e.g., a digital signal processor) that is operable to perform a filtering operation on data, a finite impulse response operation on data, motion estimation of video data, or any combination thereof. The processor may execute the FIFO load instructions 351 and 352 to perform data, load, shift, and insert operations.

The instruction cache 310 may be coupled to a sequencer 314 via a bus 311. The sequencer 314 may receive general interrupts 316, which may be retrieved from an interrupt register (not shown). In a particular embodiment, the instruction cache 310 is coupled to the sequencer 314 via a plurality of current instruction registers (not shown), which may be coupled to the bus 311 and associated with particular threads (e.g., hardware threads) of the processor 300. In a particular embodiment, the processor 300 may be an interleaved multi-threaded processor including six (6) threads.

In a particular embodiment, the bus 311 may be a one-hundred and twenty-eight bit (128-bit) bus and the sequencer 314 may be configured to retrieve instructions from the memory 102 via instruction packets (e.g., the VLIW instruction packet 350) including multiple FIFO load instructions (e.g., the first FIFO load instruction 351 and the second FIFO load instruction 352) having a length of thirty-two (32) bits each. The sequencer 314 may be coupled to a first load/store unit 318, a second load/store unit 320, a first instruction execution unit 322, and a second instruction execution unit 324. It should be noted that there may be fewer or more load/store units and instruction execution units than shown. Each unit 318-324 may include one or more load aligner units or load hardware units operable to execute a FIFO load instruction. Each unit 318-324 may be coupled to the general register file 326 via a first bus 328. The general register file 326 may also be coupled to the sequencer 314, the data cache 312, and the memory 302 via a second bus 330. The general register file 326 may include the first register 140 and the second register 340.

The system 300 may also include supervisor control registers 332 and global control registers 336 to store bits that may be accessed by control logic within the sequencer 314 to determine whether to accept interrupts (e.g., the general interrupts 316) and to control execution of instructions.

In a particular embodiment, one of the load/store units 318-320 (e.g., the first load/store unit 318) may execute the first FIFO load instruction 351. Upon execution of the first FIFO load instruction 351, the first item 150 may be loaded from the memory 102 and a shift and insert operation may be performed to shift data in the first register 140 and to insert the first item 150 into the first register 140. In accordance with data caching principles, the first item 150 may also be stored in the data cache 312. In addition, another one of the load/store units 318-320 (e.g., the second load/store unit 320) may execute the second FIFO load instruction 352. Upon execution of the second FIFO load instruction 352, the second item 360 may be loaded from the data cache 312 and a shift and insert operation may be performed to shift data in the second register 340 and to insert the second item 360 into the second register 340. In a particular embodiment, the first FIFO load instruction 351 and the second FIFO load instruction 352 may be executed in parallel by the load/store unit 318 and the load/store unit 320, respectively, during the same execution cycle. To illustrate, the items 150 and 360 may be loaded (e.g., from the memory 102 and the data cache 312), the data in the registers 140 and 340 may be shifted, and the items 150 and 360 may be inserted into the registers 140 and 340 during the same execution cycle. Other instructions may also be executed in parallel with the FIFO load instructions 351, 352. For example, multiply instructions, add instructions, multiply-and-add instructions, and sum of absolute differences instructions may be executed in parallel with the FIFO load instructions 351, 352. To illustrate, one or more of the units 318-324 may execute a FIFO load instruction while another of the units 318-324 executes a multiply instruction, an add instruction, a multiply-and-add instruction, or a sum of absolute differences instruction.

Thus, the system 300 of FIG. 3 may enable packetizing of multiple FIFO load instructions into a single VLIW packet, where such instructions may be used in connection with performing motion estimation of video objects. For example, encapsulating load, shift, and insert operations into a single instruction may enable a processor to perform motion estimation for multiple regions of a video frame or for multiple video frames in parallel. To illustrate, each of the instructions 351, 352 in the VLIW instruction packet 350 may represent filtering operations for different regions of a video frame. Such parallel processing of video data may lead to improved performance of multimedia applications.

Figure 4:
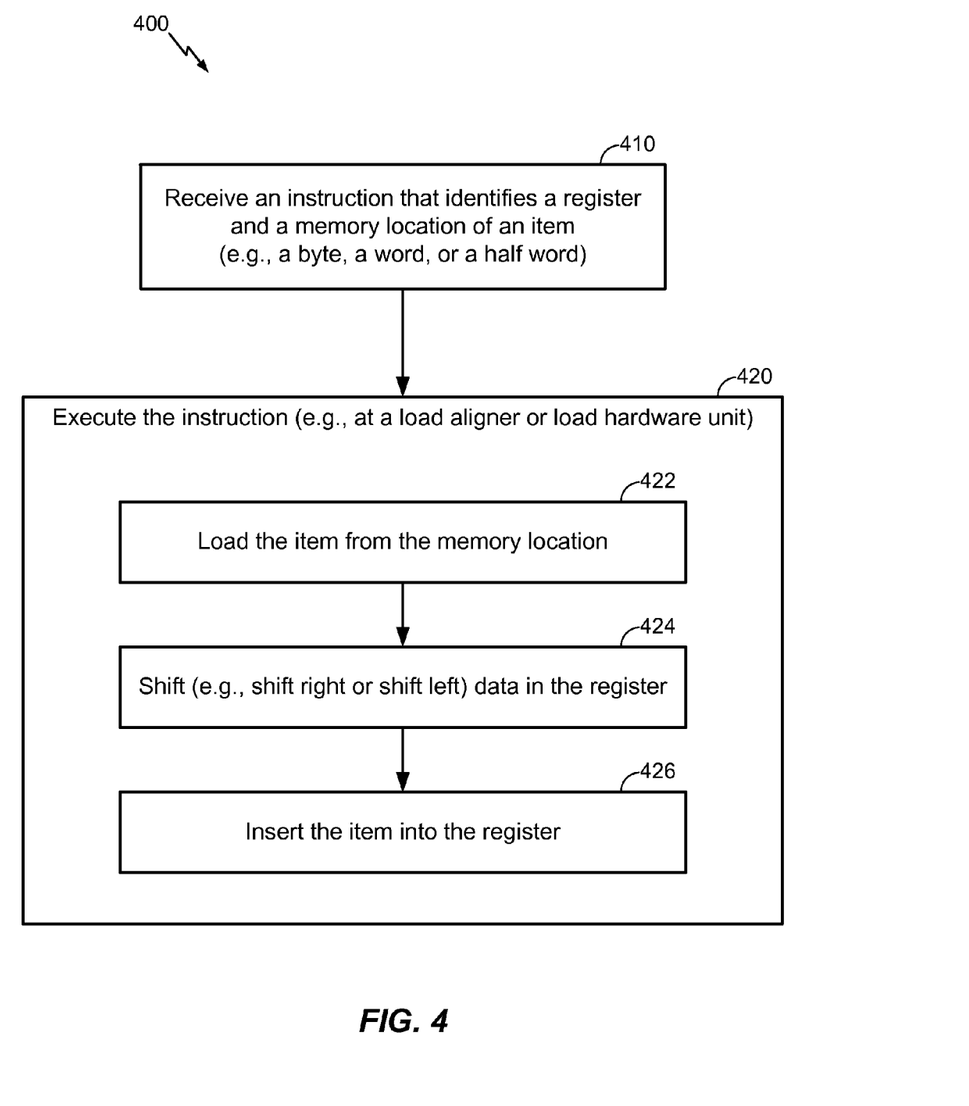
FIG. 4 is a flow chart of a particular illustrative embodiment of a method of executing an instruction that identifies a register and a memory location.

Referring to FIG. 4, a flow chart of a particular illustrative embodiment of a method of processing an instruction that identifies a register and a memory location is depicted and generally designated 400. In an illustrative embodiment, the method 400 may be performed at the system 300 of FIG. 3 and may be illustrated with reference to FIGS. 1-2.

The method 400 may include receiving an instruction that identifies a register and a memory location of an item, at 410. For example, the instruction may be stored at the memory 102 of FIG. 1 or FIG. 2 and/or at the instruction cache 310 of FIG. 3. The memory may be a register-based memory, a random access memory (RAM), another type of memory, or any combination thereof. The item may be a byte, a half-word, or a word. For example, as illustrated in FIG. 3, the VLIW instruction packet 350 including a first FIFO load instruction 351 and a second FIFO load instruction 352 may be received at a processor or component thereof (e.g., the instruction cache 310). Alternately, an instruction packet including only a single FIFO load instruction may be received.

The method 400 may also include executing the instruction, at 420. For example, referring to FIG. 3, the first FIFO load instruction 351 may be executed by the first load/store unit 318, and the second FIFO load instruction 352 may be executed by the second load/store unit 320. The first FIFO load instruction 351 may be executed in parallel with and during the same clock cycle as executing the second FIFO load instruction 352. In addition, one or both of the FIFO load instructions 351-352 may be executed in parallel with executing a multiply instruction or a sum of absolute differences instruction. The method 400 of FIG. 4 may thus enable encapsulation and processing of multiple FIFO load instructions in a single instruction packet, which may result in denser video processing code.

Executing the instruction may include loading an item from a memory location, at 422. For example, in FIG. 3, executing the instruction packet 350 may include loading the first item 150 from the memory 102 and loading the second item 360 from the data cache 312. Executing the instruction may also include shifting data in the register, at 424. In a particular embodiment, the shift is a shift right operation, as illustrated in FIG. 1. In another particular embodiment, the shift is a shift left operation, as illustrated in FIG. 2. In another particular embodiment, executing the first FIFO load instruction 351 may include performing a shift right operation and executing the second FIFO load instruction 352 may include performing a shift left operation (or vice versa). For example, in FIG. 3, the data in the first register 140 may be shifted left and the data in the second register 340 may be shifted right. Thus, the data in the registers 140, 340 may be shifted in the same direction or in different directions.

Executing the instruction may further include inserting the item into the register, at 426. For example, in FIG. 3, the first item 150 may be inserted into the first register 140, and the second item 360 may be inserted into the second register 340.

Figure 5:
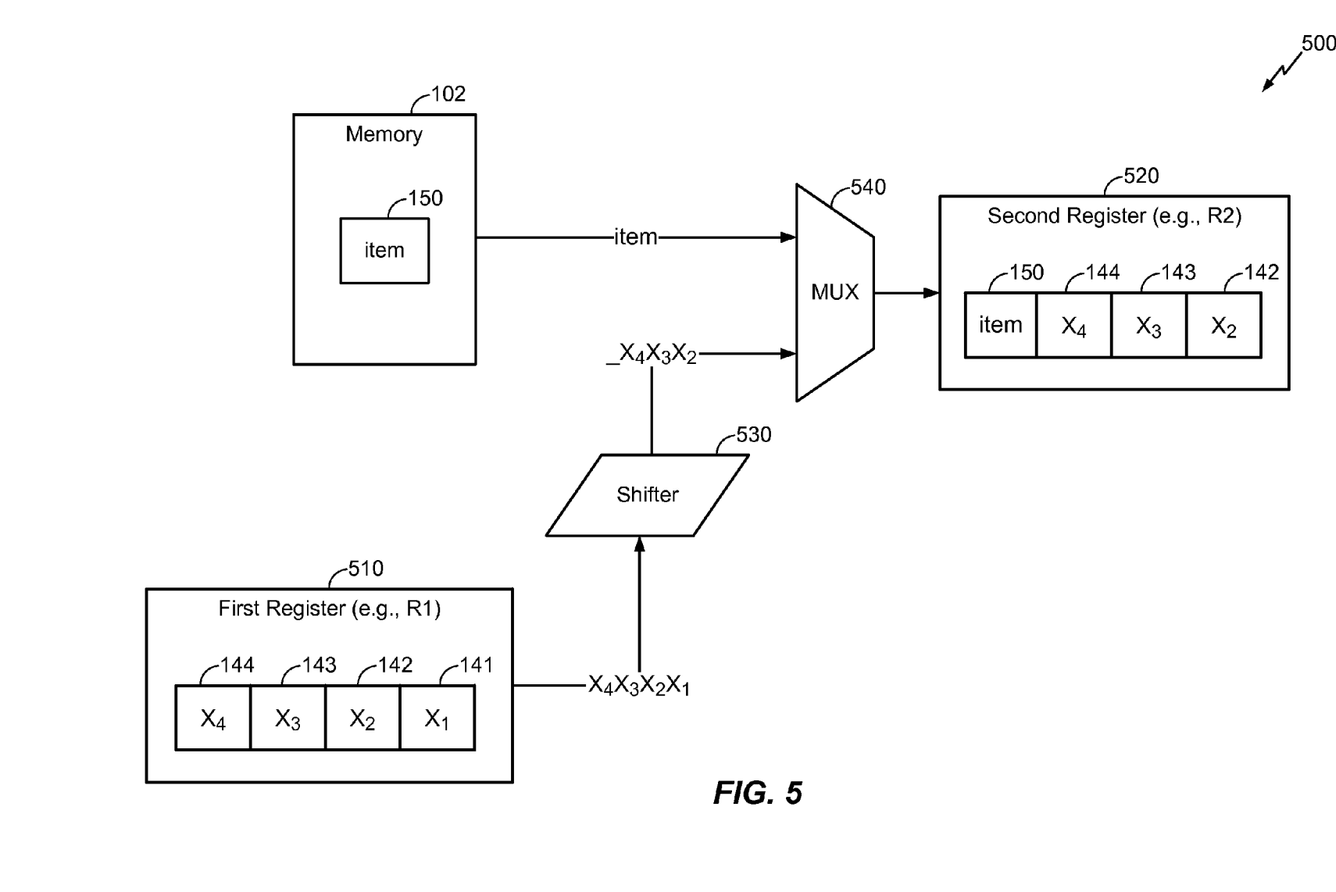
FIG. 5 is another diagram of executing an instruction that identifies a register and a memory location.

The embodiments described in FIGS. 1-4 may involve shifting data out of and loading data into the same register. Alternately, a multi-register implementation may be used. For example, FIG. 5 illustrates an embodiment of executing a FIFO load instruction using multiple registers, and is generally designated 500.

To illustrate, the data $X_4 X_3 X_2 X_1$ 144-141 of a FIFO buffer may be stored in a first register 510. During execution of the FIFO load instruction, the data $X_4 X_3 X_2 X_1$ 144-141 may be loaded into a shifter 530, and the output of the shifter 530 may be provided to a multiplexer 540. The multiplexer 540 may also receive the item 150 to be loaded into the FIFO buffer from the memory 102. In a particular embodiment, the item 150 may be aligned, replicated, zero padded, and/or sign extended as needed during the data loading process. The output of the multiplexer 540 may be stored in a second register 520, as illustrated in FIG. 5. Thus, a FIFO load instruction may used to perform load, shift, and insert operations when the source register and the destination register are different.

Figure 6:
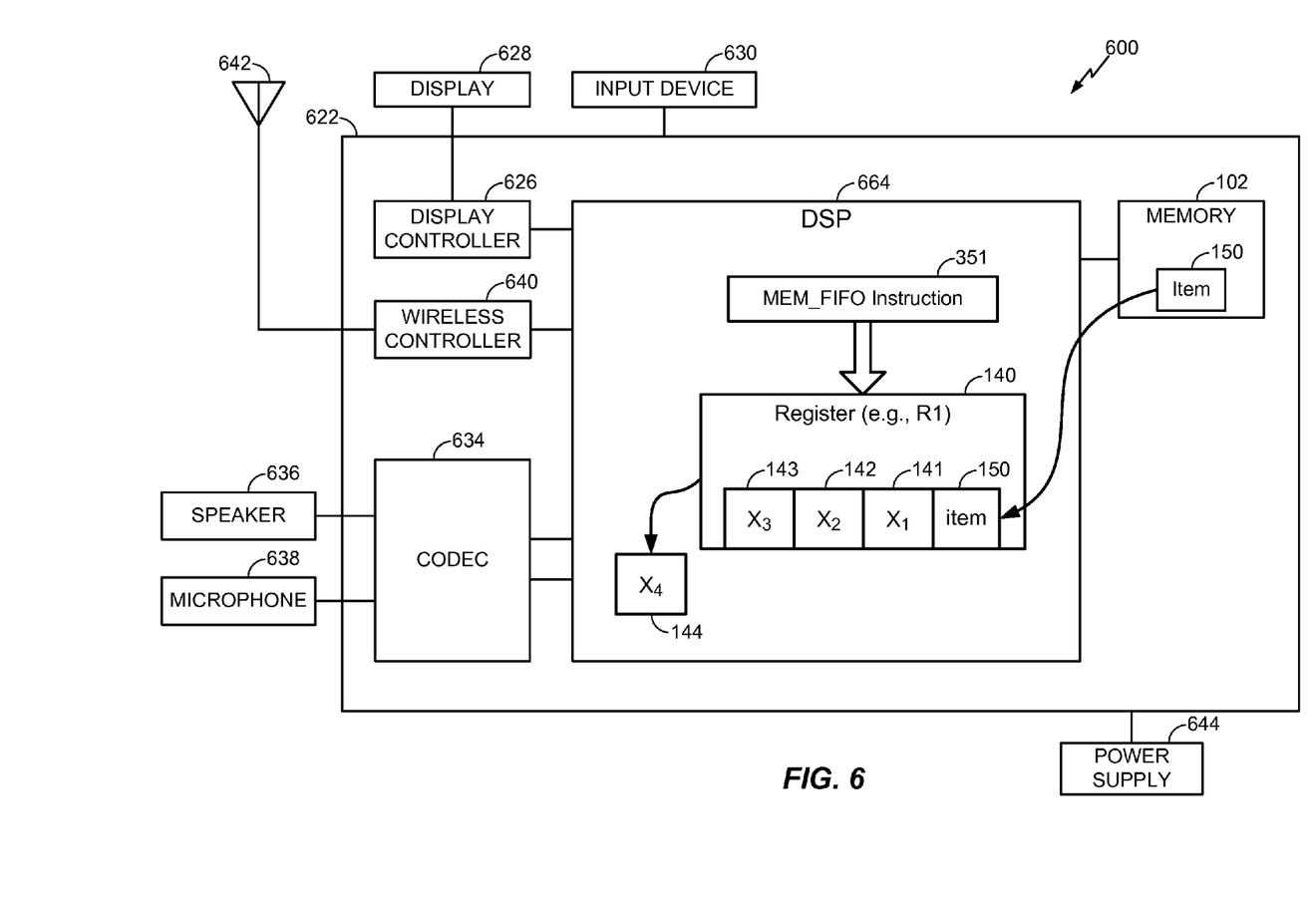
FIG. 6 is a block diagram of a particular embodiment of a wireless device including a processor operable to execute an instruction identifying a register and a memory location.

Referring to FIG. 6, a block diagram of a particular illustrative embodiment of a wireless device that includes a memory storing a FIFO load instruction identifying a register and a memory location is depicted and generally designated 600. The device 600 includes a processor, such as a digital signal processor (DSP) 664, coupled to a memory 102. In a particular embodiment, the memory 102 stores and may transmit instructions executable by the DSP 664, such as the FIFO load instruction 351. The memory 102 may also store data to be loaded, such as the item 150. The DSP may include the register 140, which stores data 144-141 (i.e., "$X_4 \ldots X_1$"), representing a FIFO buffer. Upon execution of the FIFO load instruction 351, the item 150 may be loaded from a memory location in the memory 102 and a shift and insert operation may be performed to shift the data 144-141 in the register 140 and to insert the item 150 into the register 140. For example, in FIG. 6, a shift left operation may be performed on the data 144-141, resulting in the removal of the data $X_4$ 144 from the register 140, and the item 150 may be inserted into the register 140 at the least significant portion of the register 140. Alternately, the data 144-141 in the register 140 may be shifted right (not shown), resulting in the removal of the data $X_1$ 141 from the register 140, and the item 150 may be inserted into the register 140 at the most significant portion of the register 140.

FIG. 6 also shows a display controller 626 that is coupled to the DSP 664 and to a display 628. A coder/decoder (CODEC) 634 (e.g., an audio and/or voice CODEC) can be coupled to the DSP 664. For example, the CODEC 634 may cause execution of the FIFO load instruction 351 as part of an encoding or decoding process. Other components, such as the display controller 626 (which may include a video CODEC and/or an image processor) and a wireless controller 640 (which may include a modem) may also cause execution of the FIFO load instruction 351 during signal processing. A speaker 636 and a microphone 638 can be coupled to the CODEC 634. FIG. 6 also indicates that the wireless controller 640 can be coupled to a wireless antenna 642. In a particular embodiment, the DSP 664, the display controller 626, the memory 632, the CODEC 634, and the wireless controller 640 are included in a system-in-package or system-on-chip device 622.

In a particular embodiment, an input device 630 and a power supply 644 are coupled to the system-on-chip device 622. Moreover, in a particular embodiment, as illustrated in FIG. 6, the display 628, the input device 630, the speaker 636, the microphone 638, the wireless antenna 642, and the power supply 644 are external to the system-on-chip device 622. However, each of the display 628, the input device 630, the speaker 636, the microphone 638, the wireless antenna 642, and the power supply 644 can be coupled to a component of the system-on-chip device 622, such as an interface or a controller.

It should be noted that although FIG. 6 depicts a wireless communications device, the DSP 664 and the memory 632 may also be integrated into a set-top box, a music player, a video player, an entertainment unit, a navigation device, a personal digital assistant (PDA), a fixed location data unit, or a computer. A processor (e.g., the DSP 664 or a processor including one or more of the load/store units 318-320 of FIG. 3) may also be integrated into such a device.

In conjunction with the described embodiments, an apparatus is disclosed that includes means for storing an instruction that identifies a register and a memory location. For example, the means for storing may be the memory 102 of FIGS. 1-3 and FIG. 6, the instruction cache 310 of FIG. 3, one or more other devices configured to store an instruction, or any combination thereof.

The apparatus may also include means for executing the instruction. For example, the means for executing may include one or more of the units 318, 320, 322, and 324 of FIG. 3, the shifter 530 of FIG. 5, the multiplexer 540 of FIG. 5, the DSP 664 of FIG. 6, a load hardware unit, a load aligner unit, one or more other devices configured to execute an instruction, or any combination thereof.

The apparatus may further include means for loading an item from the memory location. For example, the means for loading may be one or more of the units 318-324 of FIG. 3, a load hardware unit, a load aligner unit, one or more other devices configured to load an item from memory, or any combination thereof.

The apparatus may include means for shifting data in the register. For example, the means for shifting may be one or more of the units 318-324 of FIG. 3, a load hardware unit, a load aligner unit, a data shift unit, one or more other devices configured to shift data, or any combination thereof.

The apparatus may also include means for inserting the item into the register. For example, the means for inserting may be one or more of the units 318-324 of FIG. 3, the shifter 530 of FIG. 5, a load hardware unit, a load aligner unit, one or more other devices configured to load data, or any combination thereof.

The apparatus may further include means for executing a second instruction in parallel with executing the instruction, where the second instruction identifies a second register and a second memory location. For example, the means for executing may include one or more of the units 318-324 of FIG. 3, the shifter 530 of FIG. 5, the multiplexer 540 of FIG. 5, the DSP 664 of FIG. 6, a load hardware unit, a load aligner unit, one or more other devices configured to execute a second instruction in parallel with a first instruction, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
   a processor; and
   memory storing a first instruction that identifies a first register and a first memory location, wherein the first instruction is executable by the processor to perform operations including:
   loading a first item from the first memory location;
   performing a shift operation to shift data items in the first register to remove a first data item of the data items from a first position in the first register; and
   performing an insert operation to insert the first item into a last position of the first register,
   wherein execution of the first instruction is completed in a single execution cycle of the processor.

2. The apparatus of claim 1, wherein the first instruction identifies the first register and a second register, wherein the first register is configured to store the data items, the second register is configured to store an address of the first memory location of the memory, and wherein loading the first item is based on the address stored at the second register.

3. The apparatus of claim 1, wherein the shift operation shifts particular data in each position in the first register by a half-word.

4. The apparatus of claim 1, wherein the shift operation and the insert operation are performed by a load aligner unit.

5. The apparatus of claim 1, wherein the shift operation and the insert operation replace a portion of data from the first register with a portion of data from the first memory location.

6. The apparatus of claim 1, wherein the execution of the first instruction is performed by a load hardware unit of the processor, and wherein the first item is a byte in length.

7. The apparatus of claim 1, further comprising a very long instruction word (VLIW) packet that includes the first instruction and a second instruction.

8. The apparatus of claim 7, wherein the second instruction identifies a third register and a fourth register, wherein the third register is configured to store second data items and the fourth register is configured to store a second address of a second memory location of the memory, and wherein upon execution of the second instruction by the processor, a second item is loaded from the second memory location based on the second address stored at the fourth register, a second shift operation is performed to shift the second data items in the third register to remove a first data item of the second data items in the third register from a first position in the third register, and a second insert operation is performed to insert the second item into a last position of the third register, and wherein the second instruction is executed in parallel with execution of the first instruction.

9. The apparatus of claim 1, wherein the first instruction is executable in conjunction with other executable instructions to perform a filtering operation on the data items.

10. The apparatus of claim 9, wherein the filtering operation is a finite impulse response (FIR) operation.

11. The apparatus of claim 1, wherein the first instruction is executable in conjunction with other executable instructions to perform a motion estimation on the data, wherein the data includes video data.

12. A method comprising:
   receiving a first instruction that identifies a first register and a first memory location; and
   executing the first instruction using a processor, wherein executing the first instruction comprises:
   loading a first item from the first memory location;
   shifting data items in the first register to remove a first data item of the data items from a first position in the first register; and
   inserting the first item into a last position of the first register,
   wherein execution of the first instruction is completed in a single execution cycle of the processor.

13. The method of claim 12, further comprising:
receiving a second instruction that identifies a second register and a second memory location; and
executing the second instruction in parallel with the execution of the first instruction, wherein executing the second instruction comprises:
loading a second item from the second memory location;
shifting data items in the second register to remove a first data item of the data items from a first position in the second register; and
inserting the second item into a last position of the second register.

14. The method of claim 12, further comprising executing a multiply instruction and an add instruction in parallel with executing the first instruction.

15. The method of claim 12, further comprising performing a sum of absolute differences operation in parallel with executing the first instruction.

16. The method of claim 12, wherein the first register operates as a first-in-first-out (FIFO) buffer.

17. An apparatus comprising:
means for storing a first instruction that identifies a first register and a first memory location; and
means for executing the first instruction, wherein the means for executing the first instruction comprises:
means for loading a item from the first memory location;
means for shifting data items in the first register to remove a first data item of the data items; and
means for inserting the first item into a last position of the first register,
wherein execution of the first instruction is completed in a single execution cycle of the means for executing the first instruction.

18. The apparatus of claim 17, further comprising means for executing a second instruction in parallel with executing the first instruction, wherein the second instruction identifies a second register and a second memory location.

19. A non-transitory computer-readable medium including program code that, when executed by a processor, causes the processor to:
receive a first instruction that identifies a first register and a first memory location; and
execute the first instruction, wherein executing the first instruction comprises:
loading a first item from the first memory location;
shifting data items in the first register to remove a first data item of the data items from a first position in the first register; and
inserting the first item into a last position of the first register,
wherein execution of the first instruction is completed in a single execution cycle of the processor.

20. The non-transitory computer-readable medium of claim 19, wherein the first item is a word in length.

21. An apparatus comprising:
a memory; and
a processor coupled to the memory, the processor comprising:
a shifter;
a multiplexer;
a first register; and
a second register,
wherein a first instruction that identifies the first register and a first memory location is executable by the processor to perform operations including:
loading data in the first register to the shifter, wherein the shifter is configured to remove a first data item of the data and to maintain an order of other data items of the data;
providing an output of the shifter to the multiplexer;
providing a second data item from the first memory location of the memory to the multiplexer; and
sending multiplexer output from the multiplexer to the second register, wherein the second data item is in a last position of the second register and the other data items are in order in other positions of the second register, wherein the second register is distinct from the first memory location and is configured to store the second data item of the first memory location, and
wherein execution of the first instruction is completed in a single execution cycle of the processor.

22. The apparatus of claim 21, wherein the first item is aligned, replicated, zero padded, sign extended, or combinations thereof during the loading of the first item from the first memory location to the multiplexer.

23. The apparatus of claim 1, further comprising a second register, the second register configured to store an address of the first memory location of the memory, wherein loading the first item is based on the address stored at the second register, loaded from the first memory location, and wherein an identifier of the second register is an operand of the first instruction.

* * * * *